(12) United States Patent
Kummer et al.

(10) Patent No.: US 8,904,909 B2
(45) Date of Patent: Dec. 9, 2014

(54) DEVICE FOR MACHINING BY TURNING

(75) Inventors: Norbert Kummer, St. Georgen (DE); Peter Klaus, Schramberg-Tennenbronn (DE)

(73) Assignee: J.G. Weisser Söhne GmbH & Co. KG, St. Georgen (DE)

( * ) Notice: Subject to any disclaimer, the term of this patent is extended or adjusted under 35 U.S.C. 154(b) by 184 days.

(21) Appl. No.: 13/703,687

(22) PCT Filed: Jun. 1, 2011

(86) PCT No.: PCT/EP2011/002708
§ 371 (c)(1),
(2), (4) Date: Dec. 12, 2012

(87) PCT Pub. No.: WO2011/157360
PCT Pub. Date: Dec. 22, 2011

(65) Prior Publication Data
US 2013/0084139 A1    Apr. 4, 2013

(30) Foreign Application Priority Data
Jun. 15, 2010 (DE) ............... 20 2010 009 081 U

(51) Int. Cl.
B23D 37/00 (2006.01)
B23D 37/14 (2006.01)
B23D 43/00 (2006.01)
B23D 43/06 (2006.01)

(52) U.S. Cl.
CPC ............ B23D 37/00 (2013.01); B23D 43/00 (2013.01); *B23D 2043/063* (2013.01); B23D 37/14 (2013.01); *B23D 37/005* (2013.01)
USPC ............................. 82/53.1; 82/123

(58) Field of Classification Search
USPC .......... 82/53.1, 70.2, 101, 112, 123; 409/268; 83/294, 321
See application file for complete search history.

(56) References Cited

U.S. PATENT DOCUMENTS

| | | | | |
|---|---|---|---|---|
| 1,995,290 A * | 3/1935 | Bazzoni | ............ | 12/47.1 |
| 2,315,147 A * | 3/1943 | Wildhaber | ............ | 409/51 |
| 3,023,546 A * | 3/1962 | Beck | ............ | 451/120 |
| 3,259,019 A * | 7/1966 | Bibbens | ............ | 409/49 |
| 3,515,029 A * | 6/1970 | Gambini | ............ | 409/138 |
| 3,715,940 A * | 2/1973 | Davis | ............ | 82/63 |
| 4,856,948 A * | 8/1989 | Pomikacsek | ............ | 409/138 |
| 6,375,397 B1 * | 4/2002 | Lotz | ............ | 409/139 |

FOREIGN PATENT DOCUMENTS

| | | |
|---|---|---|
| DE | 3225514 | 1/1987 |
| DE | 10144649 | 11/2008 |
| DE | 102004026675 | 1/2010 |
| DE | 10251922 | 11/2010 |

* cited by examiner

*Primary Examiner* — Will Fridie, Jr.
(74) *Attorney, Agent, or Firm* — Volpe and Koenig, P.C.

(57) ABSTRACT

A device (1) for machining by turning rotationally symmetrical surfaces (18, 20 or 22) of a workpiece (10), which is clamped and has a rotating drive, including a tool (12) having two cutting edges (16) and (17), each having an approximately helical shape, which are disposed one behind the other in the feed direction of the tool (12) such that after the machining by turning with the first cutting edge (16), a roughing edge, the second cutting edge (17), a finishing edge, comes into engagement.

14 Claims, 2 Drawing Sheets

DEVICE FOR MACHINING BY TURNING

BACKGROUND

The invention relates to a device for the machining by turning of rotationally symmetrical surfaces of a workpiece, with a rotating drive of the chucked workpiece, the rotation of the workpiece giving rise to the machining cutting speed, with a tool having a cutting edge and with a feed of the tool, the feed speed of which is substantially lower than the cutting speed and by which the cutting edge comes into engagement with the workpiece at an active location travelling along the cutting edge, the tool with the cutting edge being arranged pivotably about a tool rotation axis, and the cutting edge being oriented on the tool such that the cutting edge obliquely intersects an axial plane containing the tool rotation axis.

What is achieved by the oblique orientation of the cutting edge with respect to the axial plane is that the cutting edge forms with the axial plane, at its intersecting point, an angle different from zero and therefore intersects the axial plane transversally. As a result of the oblique orientation, therefore, the portions of the cutting edge do not come into engagement on the workpiece simultaneously along their run, but in succession, so that the cutting edge portion in each case causing machining by turning and the circumference instantaneously machined on the workpiece travel with one another axially, that is to say parallel to the rotation axis of the workpiece, without the tool or workpiece having to be moved in this direction. This may be used advantageously for turning mark-free turning.

A device of this type is known from DE 10 2004 026 675 C5 and has proved appropriate. In many instances, however, it is necessary to apply the tool to the workpiece twice in order first to cause roughing and then to cause smoothing. The result of this is that the tool may have a reduced service life above all when used doubly in this way more frequently.

SUMMARY

The object, therefore, is to provide a device of the type initially mentioned, in which the service life of the tool and, in particular, of the cutting edge is prolonged.

The surprising solution for achieving this apparently contradictory object is for the tool to have a second cutting edge which is arranged and oriented so as to be offset to the first cutting edge by the amount of a rotary angle about the tool rotation axis and can be moved together with the first cutting edge along a feed path, the front cutting edge, as seen in the feed direction of the tool, being a roughing cutting edge and the second cutting edge a smoothing cutting edge.

According to the invention, the cutting edge may in this case have a rectilinear or curved profile, a shape of the cutting edge, by means of which, at least in the engagement position of the tool, a helical line coaxial to the tool rotation axis is at least approximately or exactly described, being especially beneficial and therefore preferred for achieving turning mark-free turning.

In particular, a solution according to the invention may therefore be one in which, in a device for the machining by turning of rotationally symmetrical surfaces of a workpiece, with a rotating drive of the chucked workpiece, the rotation of the workpiece giving rise to the machining cutting speed, with a tool having a cutting edge and with a feed of the tool, the feed speed of which is substantially lower than the cutting speed and by which the cutting edge comes into engagement with the workpiece at an active location travelling along the cutting edge, the tool being movable about a tool rotation axis, so that the cutting edge is moved along a feed path in the form of an arc of a circle, and the cutting edge having the shape of a helical line coaxial to the tool rotation axis, there is provision whereby the tool has a second cutting edge which is arranged parallel to the first cutting edge and which can be moved, together with the latter, along a feed path in the form of an arc of a circle, and whereby the second cutting edge also has the shape of a helical line coaxial to the common tool rotation axis, the front cutting edge, as seen in the feed direction of the tool, being a roughing cutting edge and the second cutting edge being a smoothing cutting edge.

The cutting edge of a tool is understood to mean the front tool edge which, during machining by turning, determines the dimension of the machined workpiece.

Admittedly, it is also known from DE 10 2004 026 675 C5 to provide a disk-shaped tool carrier, on the circumference of which even a plurality of offset tools may be arranged. However, these are intended to be used selectively in order to generate different surfaces. The combination of a roughing cutting edge with a smoothing cutting edge preferably on a single tool cannot be gathered from this.

This combination of a roughing cutting edge with a smoothing cutting edge enables the user, in one chucking of the workpiece, to carry out roughing of the latter and, in a continuation of the feed movement of the tool, also its smoothing, while at the same time the service life of the tool or of the cutting edges is prolonged on account of this division of work. The smoothing cutting edge, above all, can have an appreciably longer service life.

In one refinement of the invention, there may be provision for the cutting edges to be designed in each case to be rectilinear. It is advantageous in this case that the tools can be manufactured especially simply.

In one refinement of the invention, there may be provision for the cutting edges to have the shape of a helical line coaxial to the tool rotation axis. It is advantageous in this case that additional compensating movements on the tool or workpiece to achieve a cylindrical shape can be dispensed with entirely or virtually completely.

There may be provision for the feed path to be in the form of an arc of a circle. It is advantageous in this case that the movement can be executed by means of a small number of feed and/or advancing drives and at low outlay in regulating terms.

It is especially beneficial if the cutting edges maintain a constant distance from one another along their directions of run. It is advantageous in this case that simple geometric conditions are achieved and that the time interval in which the individual portions of the cutting edges come into engagement on the workpiece in each case in succession remains the same for all the axial positions machined by turning, provided that the pivoting movement of the tool about the tool rotation axis is uniform.

There may be provision whereby the feed of the tool is set up for executing a compensating movement of the tool, superposed on the pivoting movement of the tool about the tool rotation axis, for the purpose of turning free of turning marks. It is advantageous in this case that deviations from the theoretical ideal helical shape of the cutting edge, such as necessarily arise, for example, in the case of a rectilinear cutting edge, can be compensated in a simple way. It is especially beneficial if the feed of the tool is set up for executing a compensating movement oriented radially to the tool rotation axis or if the feed of the tool is set up for executing a compensating movement oriented radially to a workpiece rotation axis.

The distance in the feed direction between the smoothing cutting edge and the roughing cutting edge may correspond approximately to the feed movement of the roughing cutting edge for circumferential machining of the workpiece, so that, when the feed of the tool is continued after the end of the roughing operation, the smoothing cutting edge comes into engagement and is in engagement with the workpiece. By a skillful choice of the distance between the two cutting edges, therefore, the smoothing operation can immediately follow the roughing operation, so that, on the one hand, the smoothing cutting edge is protected because it finds an already machined surface, but, on the other hand, without a considerable loss of time occurring.

It is especially beneficial in this case if the roughing cutting edge and the smoothing cutting edge are arranged on a common holder. This ensures in a simple way the continuing feed movement of the two cutting edges one behind the other at the desired distance. A further advantage is that the roughing cutting edge and the smoothing cutting edge may be arranged via the holder in a common receptacle on a tool turret.

The holder for the two cutting edges may have, in their fastening region, a widening which is oriented in the feed direction and on which the at least two cutting edges are arranged one behind the other in the feed direction. As a result of the widening, the desired and required distance between the two cutting edges can be provided and maintained in a simple way.

It is beneficial if at least one of the cutting edges or all the cutting edges are, in particular, exchangeable individually. Depending on wear, one cutting edge can then be exchanged, usually the roughing cutting edge being the first to be exchanged.

The helical lines of the cutting edges may have a pitch with a pitch angle of between 0° and 90°, preferably of between 15° and 45°, and the pitch angle may be positive or negative with respect to the feed direction. This shape of the helical line has already proved appropriate in the device according to DE 10 2004 026 675 C5 for the one cutting edge and may be provided in the same way for the arrangement according to the invention of two successively active cutting edges.

In so far as the cutting edges deviate from the helical shape, for example are designed to be rectilinear or curved in any way, there may be correspondingly be provision whereby the cutting edges are oriented tangentially to helical lines which have a pitch with a pitch angle of between 0° and 90°, preferably of between 15° and 45°, the pitch angle being positive or negative with respect to the feed direction.

In this context, the tangential orientation of the cutting edge with respect to the (imaginary) helical line means that the one-dimensional curve described by the cutting edge touches the helical line at a point and osculates the helical line in such a way that the tangential vector to the cutting edge runs, at the touching point, parallel to the tangential vector to the helical line, so that both tangential vectors lie on the same straight line. A special case of tangential orientation is the orientation of a rectilinear cutting edge along a tangential vector to the helical line, but a tangential orientation of a curved cutting edge to a helical line is also possible. In other words, the cutting edges in each case touch a helical line having the indicated features tangentially and osculate the helical line at the touching point.

Following DE 10 2004 026 675 C5, there may be provision in the device according to the invention, too, whereby the two cutting edges have the shape of a helical line or are oriented in each case tangentially to a helical line, the helical lines running in the surface area of a straight circular cylinder of constant diameter or in the surface area of a cone. Correspondingly shaped workpieces can thus be roughed and smoothed.

The tool rotation axis and the workpiece rotation axis may run parallel to one another or so as to be inclined at an angle of 0° to 90° to one another, for example so that cylindrical outer surfaces or else large-area end faces or planar surfaces can be machined.

In a modified embodiment, there may be provision whereby the radius of the feed or pivoting movement, in the form of an arc of a circle, of the cutting edges is smaller than the radius of an inner surface to be machined of the workpiece, so that such inner surfaces can also be roughed and smoothed by cutting in the same way.

To avoid excessive heating of the tool, there may be provision for the tool to be cooled. It is especially beneficial if the tool is air-cooled.

There may be provision for the tool to have an internal cooling duct. The cooling duct is thus arranged so as to be protected from external mechanical stresses.

To supply both cutting edges simultaneously, the cooling duct may be designed to be branched to the cutting edges in a valve-free manner. This valve-free version is especially beneficial in the case of air cooling, since in this case the outflow of coolant at the instantaneously non-cutting cutting edge does not disturb machining by turning or disturbs it only slightly.

Overall in the case of a combination of individual or several features and measures of those described above, a device is obtained, by means of which rotationally symmetrical surfaces can be machined by cutting, turning mark-free machining with a high cutting capacity being made possible in a simple way, which is increased even further in that a roughing cutting edge and a smoothing cutting edge are combined such that they can be used in succession virtually without any loss of time, as a result of which, in particular, the smoothing cutting edge can also achieve a longer service life than if a workpiece were machined by only one cutting edge.

BRIEF DESCRIPTION OF THE DRAWINGS

Exemplary embodiments of the invention are described in more detail below by means of the drawing. In this, in a sometimes considerably diagrammatic illustration.

DETAILED DESCRIPTION OF THE PREFERRED EMBODIMENTS

Figure 1:
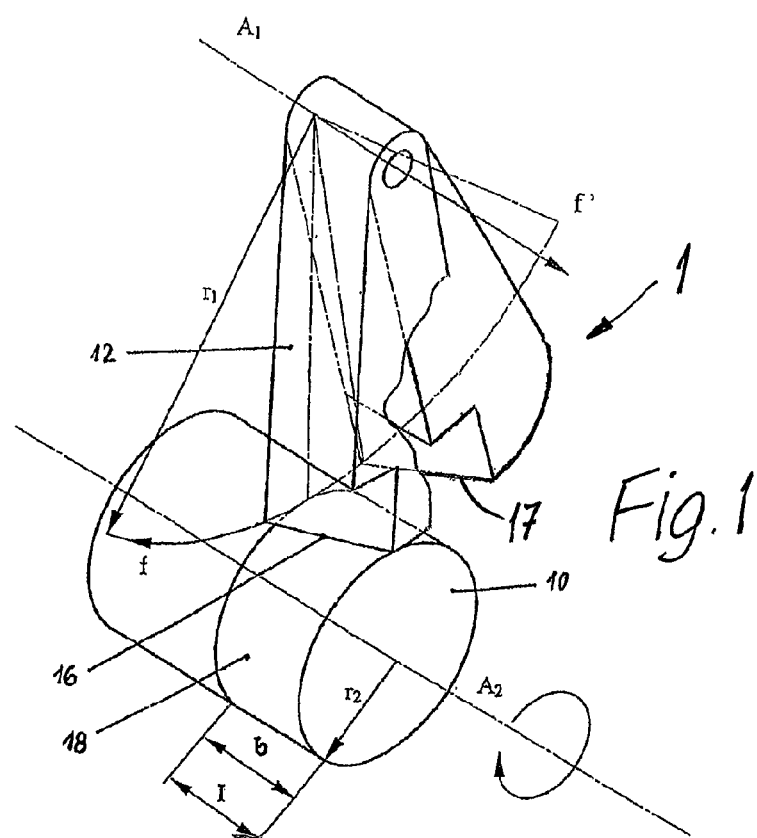
FIG. 1 shows a device according to the invention for machining rotationally symmetrical surfaces by turning, a tool movable about a tool rotation axis having a first cutting edge which is in the working position, while a second cutting edge, a smoothing cutting edge, is arranged behind it in the feed direction of the tool, a cylindrical workpiece being machined.
Figure 2:
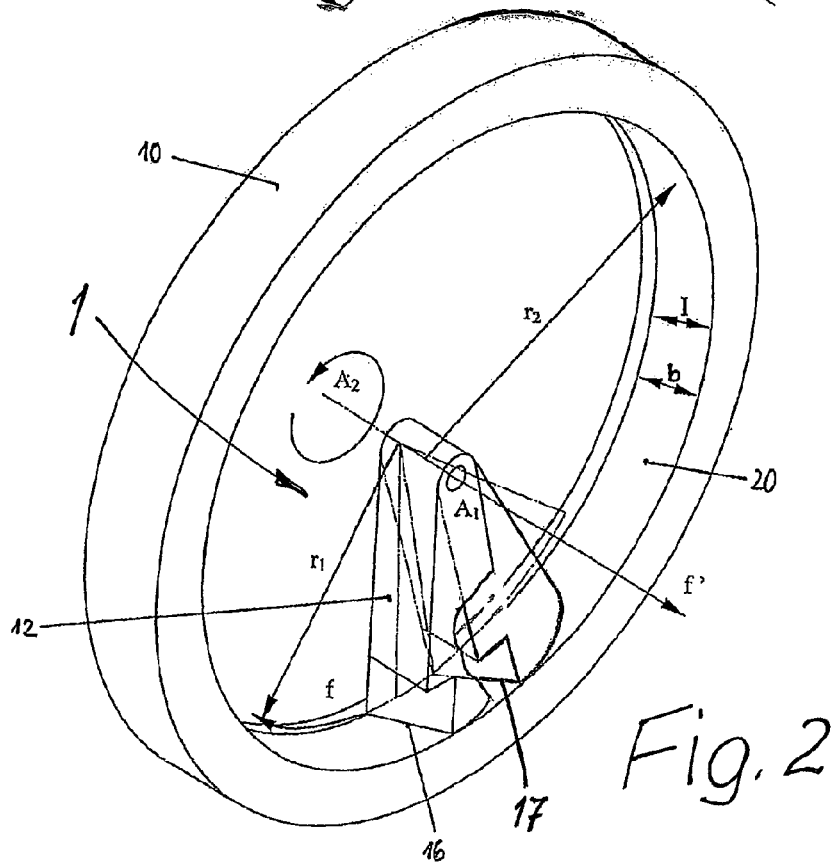
FIG. 2 shows an illustration corresponding to FIG. 1, the tool with a roughing cutting edge and with a smoothing cutting edge engaging on the inner surface of a rotationally symmetrical workpiece and being movable about the tool rotation axis, while the workpiece rotates at a high rotational speed.
Figure 3:
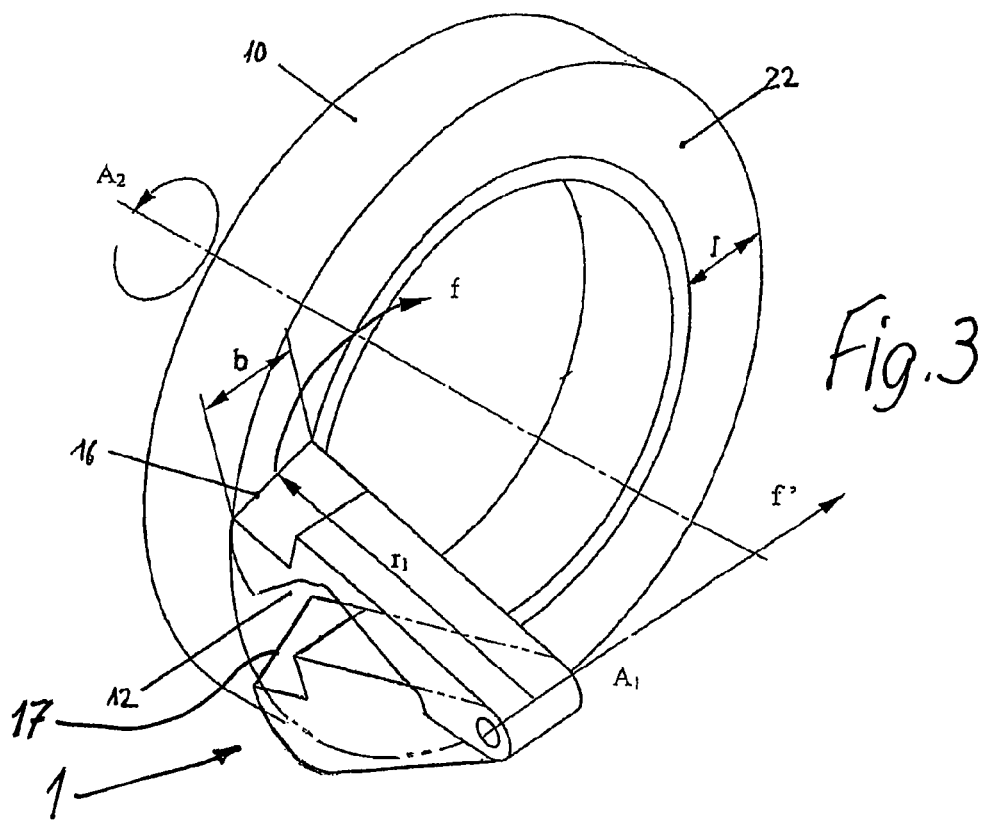
FIG. 3 shows a device according to the invention with a tool having a roughing cutting edge and a smoothing cutting edge which engage on a planar surface of a rotationally symmetrical workpiece.

A device, designated as a whole by 1, serves for the machining by turning of rotationally symmetrical surfaces of a workpiece 10 which may be configured differently according to FIGS. 1 to 3.

In all the exemplary embodiments, the workpiece 10 has a rotating drive, not illustrated in any more detail, the workpiece 10 being chucked in a known way so that machining by turning of a rotationally symmetrical surface of the respective workpiece 10 can be carried out, the rotation of the workpiece 10 giving rise to the machining cutting speed. Furthermore, the device 1 includes a tool 12, which is indicated diagrammatically in FIGS. 1 to 3, which, during machining, is moved with a feed, the speed of which is substantially lower than the cutting speed and by which a cutting edge 16 of the tool 12 comes into engagement with the workpiece 10 at an active location travelling along this cutting edge 16.

In all the exemplary embodiments, the tool 12 is in this case movable about a tool rotation axis A1, so that the cutting edge 16 is moved along a feed path f in the form of an arc of a circle. The cutting edge 16 in this case has the shape of a helical line coaxial to the tool rotation axis A1. The rotation of the workpiece 10 in this case takes place about the workpiece rotation axis A2.

In further exemplary embodiments, the cutting edge 16 does not have the shape of an exact coaxial helical line, but instead is merely approximated to such. For example the cutting edge 16 may also be designed to be rectilinear or slightly curved and may touch the imaginary helical line tangentially at a touching point or be oriented tangentially to the helical line or osculate the helical line tangentially. In this case, the feed, not illustrated in any more detail, for the tool 12 has an additional movement axis in order to allow compensating movements along the direction of the radius r1.

If the cutting edge 16 is imagined to be subdivided into successive cutting edge portions adjacent to one another, the shape and orientation of the cutting edges have the effect that the individual cutting edge portions come into cutting-machining engagement on the workpiece successively in time. The instantaneous rotary machining circumference consequently travels in the axial direction, without the tool or workpiece having to be moved axially.

In all the exemplary embodiments illustrated, it can be seen that the tool 12 has, in addition to the cutting edge 16 already mentioned, a second cutting edge 17 which is arranged parallel to the first cutting edge 16 and which can be moved together with the latter along the feed path f in the form of an arc of a circle, this second cutting edge 17, too, having the shape of a helical line coaxial to the common tool rotation axis A1.

The front cutting edge 16, as seen in the feed direction or in the direction of the feed path f of the tool 12, is in this case a roughing cutting edge and the second cutting edge 17 a smoothing cutting edge. The first cutting edge is therefore also referred to below as the "roughing cutting edge 16" and the second cutting edge as the "smoothing cutting edge 17".

The smoothing cutting edge 17 is therefore arranged behind the roughing cutting edge 16 in the feed direction of the tool 12, that is to say follows said roughing cutting edge and can therefore come into engagement immediately after the roughing and, in a following operation, smooth the tool surface virtually without any interruption. This makes it possible to have a more accurate and also finer machining of the workpiece 10 on its surface in each case being machined by cutting.

In this case, in all the exemplary embodiments, the distance of the smoothing cutting edge 17 from the roughing cutting edge 16 is dimensioned such that said distance corresponds to the feed movement or to the feed of the roughing cutting edge 16 for circumferential machining of the workpiece 10, so that, when the feed of the tool 12 is continued after the end of the roughing operation, the smoothing cutting edge 17 is in engagement with this workpiece 10 and the smoothing machining can immediately follow the roughing machining.

Figure 4:
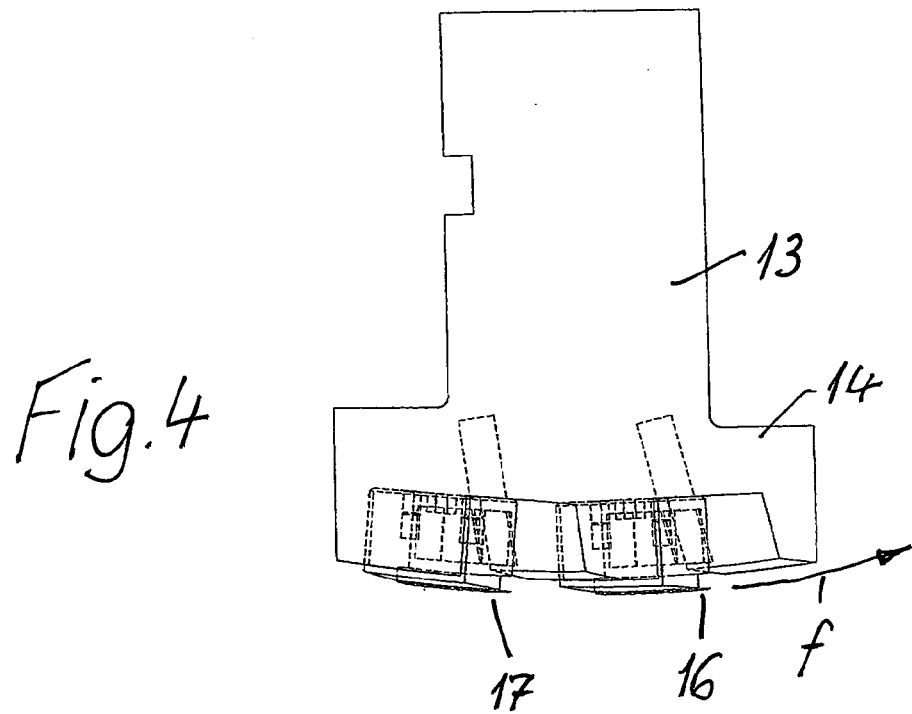
FIG. 4 shows a side view of a tool with two cutting edges, to be precise a roughing cutting edge and a smoothing cutting edge, arranged one behind the other in the feed direction of the tool.

It is illustrated, above all in FIG. 4, that the roughing cutting edge 16 and the smoothing cutting edge 17 are arranged on a common holder 13, so that their mutual distance is also unchanged. In this case, the roughing cutting edge 16 and/or the smoothing cutting edge 17 may, in particular, be exchangeable individually, so that, depending on wear, they could be replaced, although the cutting edge not yet worn too much can then continue to be used. Since machining by turning is divided between two cutting edges, correspondingly longer service lives are obtained.

It can be seen in FIG. 4 that the holder 13 for the two cutting edges has, in their fastening region, a widening 14 which is oriented in the feed direction and on which the two cutting edges are arranged one behind the other in the feed direction and, because of this widening 14, also have sufficient space for the distance necessary between them.

In all the exemplary embodiments illustrated, the two cutting edges 16 and 17 have in each case the shape of a helical line which runs along the generatrix of a straight circular cylinder of constant diameter which corresponds to double the radius r1 of the feed path f in the form of an arc of a circle. It would also be conceivable, however, to select cutting edges which run in the surface area of a cone when a conical workpiece 10 is to be machined.

In further exemplary embodiments in which the cutting edge 16 deviates from the exact helical shape, the shape and orientation of the cutting edge 17 are co-ordinated with the shape and orientation of the cutting edge 16.

In the exemplary embodiments according to FIGS. 1 and 2, the tool rotation axis A1 and the workpiece rotation axis A2 run parallel to one another.

In the exemplary embodiment according to FIG. 3, the tool rotation axis A1 is inclined at an angle of 90° with respect to the workpiece rotation axis A2, that is to say stands at right angles to this, so that a planar surface 22 on a rotationally symmetrical workpiece 10 can be machined.

In the exemplary embodiment according to FIG. 1, the tool rotation axis A1 and the workpiece rotation axis A2 are spaced apart from one another and run parallel, so that the cutting edges 16 and 17 machine an outer surface 18 of the cylindrical workpiece 10.

In the exemplary embodiment according to FIG. 2, the cutting edges 16 and 17 are arranged such that they can machine a cylindrical inner surface 20 of a workpiece 10.

What can be seen in this case, in all three exemplary embodiments, are, on the one hand, the axial width b of the cutting edges 16 and 17 and, on the other hand, the width l of the machined surface 18, 20 or 22.

It may also be mentioned that the radius r1 of the feed movement, in the form of an arc of a circle, of the cutting edges 16 and 17 could also be smaller than the radius r2 of an inner surface 20 to be machined of the workpiece 10.

The device 1 for the machining by turning of rotationally symmetrical surfaces 18, 20 or 22 of a workpiece 10 which is chucked and has a rotating drive has a tool 12 with two cutting edges 16 and 17 which are in each case approximated to a helical shape and which are arranged one behind the other in the feed direction of the tool 12 in such a way that, after machining by turning with the first cutting edge 16, a roughing cutting edge, the second cutting edge 17, a smoothing cutting edge, comes into engagement. The tool 12 with its two cutting edges is in this case movable about a tool rotation axis A1, so that the cutting edges 16 and 17 are moved along a feed path f, in the form of an arc of a circle, which may possibly be somewhat different in terms of its radius r1, although a different engagement of the two cutting edges 16 and 17 could also be compensated by a transverse movement of the tool 12 and/or of the workpiece 10.

The invention claimed is:

1. A device (1) for machining by turning of rotationally symmetrical surfaces of a workpiece (10), comprising a rotating drive for the workpiece chucked thereto, rotation of the workpiece (10) creates a cutting speed of a cutting operation, a tool (12) having a cutting edge and with a feed for the tool, a feed speed of which is substantially lower than the cutting speed and by which the cutting edge (16) comes into engagement with the workpiece (10) at an active location travelling along the cutting edge (16), the tool (12) with the cutting edge (16) being arranged pivotably about a tool rotation axis (A1), and the cutting edge (16) being oriented on the tool (12) such that the cutting edge (16) obliquely intersects an axial plane containing a tool rotation axis (A1), the tool (12) having a second cutting edge (17) which is arranged and oriented so as to be offset to the first cutting edge (16) by an amount of a rotary angle about the tool rotation axis (A1) and can be moved together with the first cutting edge (16) along a feed path (f), the first cutting edge (16), which is in front as seen in the feed direction of the tool (12), being a roughing cutting edge (17) and the second cutting edge being a smoothing cutting edge, an axial width (b) of the cutting edges (16, 17) is equal to a width (1) of a surface (18, 20, 22) machined by the cutting edges (16, 17), and the feed of the tool (12) is set up for executing a compensating movement of the tool (12), superposed on the pivoting movement of the tool (12) about the tool rotation axis (A1) and oriented radially to the tool rotation axis (A1) or to a workpiece rotation axis (A2), for turning free of turning marks.

2. The device as claimed in claim 1, wherein the cutting edges (16, 17) are in each case rectilinear, or the cutting edges (16, 17) have a shape of a helical line coaxial to the tool rotation axis (A1).

3. The device as claimed in claim 1, wherein the feed path (f) is in the form of an arc of a circle.

4. The a device as claimed in claim 1, wherein a distance between the smoothing cutting edge (17) and the roughing cutting edge (16) corresponds to a feed movement of the roughing cutting edge for circumferential machining of the workpiece (10), so that, when the feed of the tool (12) is continued after an end of a roughing operation, the smoothing cutting edge (17) is in engagement with the workpiece (10).

5. The device as claimed in claim 1, wherein the roughing cutting edge (16) and the smoothing cutting edge (17) are arranged on a common holder (13).

6. The device as claimed in claim 5, wherein the holder (13) for the two cutting edges (16, 17) has, in a fastening region, a widening (14) which is oriented in the feed direction (f) and on which the two cutting edges are arranged one behind the other in the feed direction (f).

7. The device as claimed in claim 1, wherein at least one of the cutting edges or all the cutting edges (16, 17) are exchangeable individually.

8. The device as claimed in claim 1, wherein the cutting edges have a shape of a helical line and the helical lines of the cutting edges (16, 17) have a pitch with a pitch angle of between 0° and 90° the pitch angle being positive or negative with respect to the feed direction, or the cutting edges (16, 17) are oriented tangentially to helical lines which have a pitch with a pitch angle of between 0° and 90°, the pitch angle being positive or negative with respect to the feed direction.

9. The device as claimed in claim 1, wherein the cutting edges (16, 17) have in each case the shape of a helical line or are oriented in each case tangentially to a helical line, the helical lines running in a surface area of a straight circular cylinder of constant diameter or in a surface area of a cone.

10. The device as claimed in claim 1, wherein the tool rotation axis (A1) and the workpiece rotation axis (A2) run parallel to one another, or in that the tool rotation axis (A1) is inclined at an angle of 0° to 90° with respect to the workpiece rotation axis (A2).

11. The device as claimed in claim 1, wherein a radius (r1) of the feed or pivoting movement, in the form of an arc of a circle, of the cutting edges (16, 17) is smaller than a radius (r2) of an inner surface (20) to be machined of the workpiece (10).

12. The device as claimed in claim 1, wherein the tool (12) is cooled, or the tool (12) has an internal cooling duct.

13. The device as claimed in claim 12, wherein the tool has the internal cooling duct that is branched to the cutting edge.

14. The device as claimed in claim 1, wherein the cutting edges (16, 17) maintain a constant distance from one another along a direction of run.

* * * * *